United States Patent
Liao et al.

(10) Patent No.: US 12,404,384 B2
(45) Date of Patent: Sep. 2, 2025

(54) METHOD FOR RECYCLING POLYESTER FABRIC

(71) Applicant: NAN YA PLASTICS CORPORATION, Taipei (TW)

(72) Inventors: Te-Chao Liao, Taipei (TW); Jung-Jen Chuang, Taipei (TW); Zhang-Jian Huang, Taipei (TW); Yu-Ti Tseng, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 634 days.

(21) Appl. No.: 17/862,369

(22) Filed: Jul. 11, 2022

(65) Prior Publication Data

US 2023/0093536 A1    Mar. 23, 2023

(30) Foreign Application Priority Data

Sep. 13, 2021 (TW) ................................. 110133956

(51) Int. Cl.
| | |
|---|---|
| *C08J 11/08* | (2006.01) |
| *B29B 17/02* | (2006.01) |
| *B29B 17/04* | (2006.01) |
| *C08J 3/12* | (2006.01) |
| *D06P 5/04* | (2006.01) |
| *B29K 67/00* | (2006.01) |

(52) U.S. Cl.
CPC ............... *C08J 11/08* (2013.01); *B29B 17/02* (2013.01); *B29B 17/0412* (2013.01); *C08J 3/12* (2013.01); *D06P 5/04* (2013.01); *B29B 2017/0293* (2013.01); *B29K 2067/00* (2013.01); *C08J 2367/00* (2013.01); *D10B 2331/04* (2013.01)

(58) Field of Classification Search
USPC .......................... 528/190, 193, 194; 521/48
See application file for complete search history.

(56) References Cited

U.S. PATENT DOCUMENTS

| | | | |
|---|---|---|---|
| 3,806,316 A * | 4/1974 | Lewkowitz et al. .. | D06P 1/6515 8/102 |
| 6,140,463 A | 10/2000 | Stefandl | |
| 7,959,807 B2 | 6/2011 | Mukai et al. | |
| 9,908,263 B2 * | 3/2018 | Pichler ................... | B29C 48/54 |
| 2005/0065315 A1 | 3/2005 | Bonner et al. | |
| 2008/0194713 A1 | 8/2008 | Kim | |
| 2015/0059103 A1 | 3/2015 | Liu et al. | |
| 2016/0229982 A1 | 8/2016 | Phillips et al. | |
| 2019/0024305 A1 | 1/2019 | Ellis et al. | |
| 2020/0270790 A1 | 8/2020 | Liao et al. | |

FOREIGN PATENT DOCUMENTS

| | | | | |
|---|---|---|---|---|
| CN | 101634115 | A | 1/2010 | |
| CN | 104710601 | A | 6/2015 | |
| CN | 107722249 | A | 2/2018 | |
| CN | 108951233 | A | 12/2018 | |
| CN | 109468868 | A | 3/2019 | |
| JP | 2005255963 | A | 9/2005 | |
| JP | 200888324 | A | 4/2008 | |
| JP | 201548570 | A | 3/2015 | |
| JP | 2020133089 | A | 8/2020 | |
| KR | 1020050095504 | A | 9/2005 | |
| TW | I481762 | B | 4/2015 | |
| TW | 202104399 | A | 2/2021 | |
| WO | WO-2005092949 | A1 * | 10/2005 | ............... B29B 9/16 |
| WO | WO-2017118671 | A1 * | 7/2017 | ............ D06P 1/6533 |

OTHER PUBLICATIONS

WO2005092949A1 Machine Translation (Year: 2005).*
Cui-Xiao, Liu Fu-Sheng, Li-Zhuo, Yu Shi-Tao, "Hydrolysis of poly(ethylene terephthalate) to recover terephthalic acid in ionic liquids", Chemical Engineering(China), vol. 38 No 4, Apr. 15, 2010, pp. 40-44.
Yan Hai-Tao, "Further Discussion on Waste Textile Recycling-PET Recycling Technology", Journal of Chengdu Textile College, vol. 33 No. 1, Jan. 20, 2016, pp. 181-185.

* cited by examiner

*Primary Examiner* — Terressa Boykin
(74) *Attorney, Agent, or Firm* — Li & Cai Intellectual Property Office

(57) ABSTRACT

A method for recycling a polyester fabric is provided. The method includes providing a polyester fabric that is dyed and has dye and water repellent attached thereon, providing a composite solvent containing water and acetic acid mixed with each other, performing an extraction operation including infiltrating the polyester fabric with the composite solvent and extracting the dye and the water repellent, and carrying out a liquid state polycondensation reaction on the polyester fabric so that an intrinsic viscosity of the polyester fabric is increased and residual impurities of the polyester fabric are further removed.

10 Claims, 1 Drawing Sheet

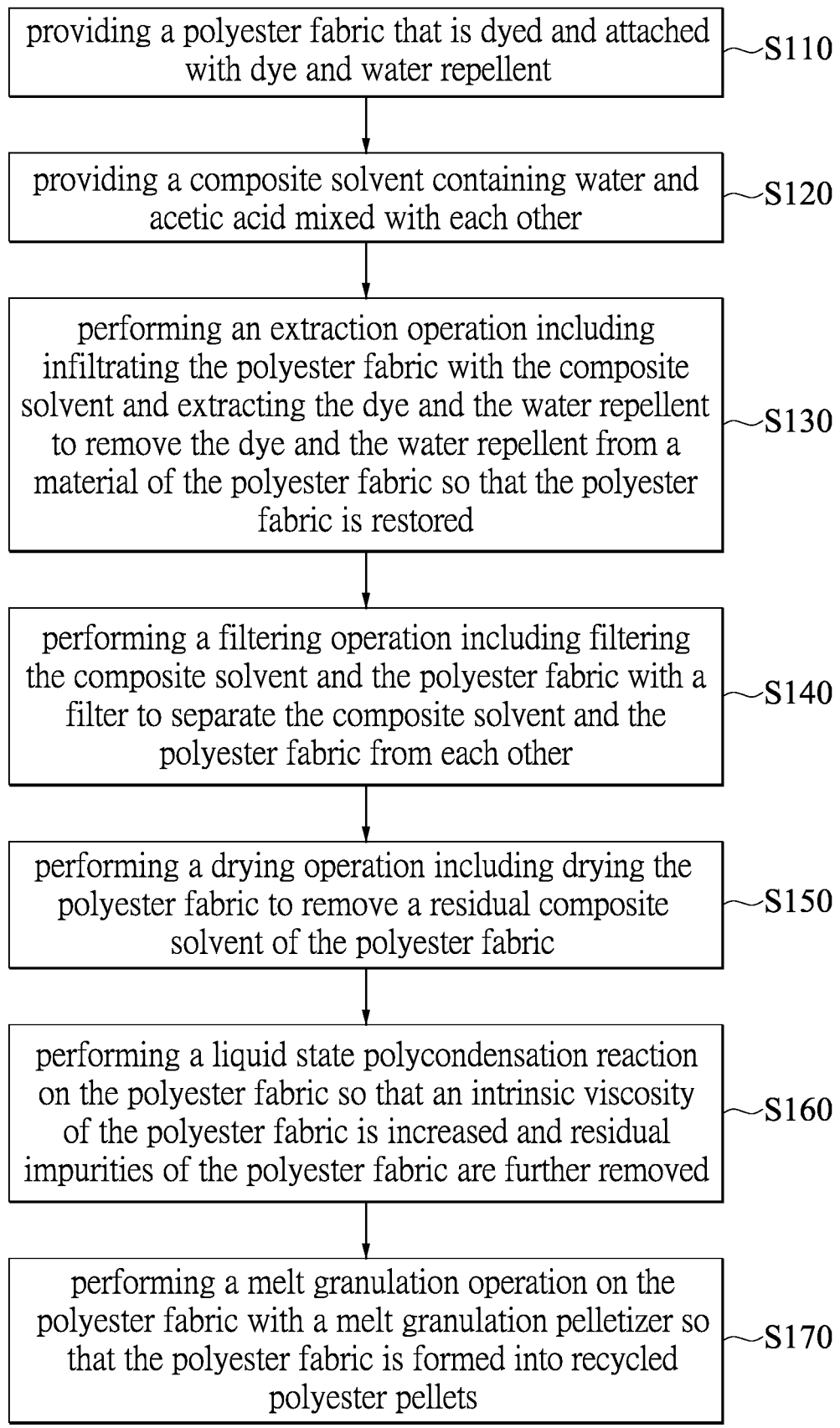

METHOD FOR RECYCLING POLYESTER FABRIC

CROSS-REFERENCE TO RELATED PATENT APPLICATION

This application claims the benefit of priority to Taiwan Patent Application No. 110133956, filed on Sep. 13, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a recycling method, and more particularly to a method for recycling a polyester fabric.

BACKGROUND OF THE DISCLOSURE

Conventionally, the material of dyed polyester fabrics contains dye and water repellent, and for recycled polyester fabrics, the dye and the water repellent are impurities. Therefore, before recycling the polyester fabrics, the dye and the water repellent attached to the polyester fabrics must be removed.

In the related art, using solvents for extraction only removes the dye attached to the polyester fabrics, but the water repellent attached to the polyester fabrics cannot be effectively removed. Therefore, the polyester fabrics have excessive residual water repellent that is attached to the materials thereof, so that the polyester fabrics cannot be recycled or lead to problems such as having poor recycling quality and limited use, etc.

U.S. Pat. No. 7,959,807 provides a method for recycling useful components from dyed polyester fabrics. The method of the U.S. Pat. No. 7,959,807 has high dye removal efficiency, so that recycled polyester fabrics are white in color. However, after extraction with solvent and pressure filtration, water repellent attached to the polyester fabrics still cannot be removed, and the residual concentration of the water repellent is approximately 10,000 ppm, causing the recycling quality and usage of the polyester fabrics to be negatively influenced. For example, recycled fibers of the polyester fabrics are prone to breakage due to having impurities.

Taiwan Patent No. 1481762 provides a method for performing a depigmentation on dyed polyester fabrics, which is to extract dye by using evaporation gas as a solvent. The method of Taiwan Patent No. 1481762 has greater dye extraction efficiency, but also has the disadvantage of high energy consumption. Furthermore, the method of the Taiwan Patent No. 1481762 also has the problem that a water repellent attached to the polyester fabrics cannot be removed, thereby causing the polyester fabrics to have residual water repellent.

U.S. Patent Publication No. 20050065315 provides a method for performing a solid-state polymerization on polyesters to improve an intrinsic viscosity of the polyesters. However, when performed on recycled polyester fabrics, the color of polyester fabrics becomes deeper, and said method has disadvantages such as difficulty in removing solid residue, etc.

SUMMARY OF THE DISCLOSURE

In response to the above-referenced technical inadequacies, the present disclosure provides a method for recycling a polyester fabric.

In one aspect, the present disclosure provides a method for recycling a polyester fabric. The method includes providing a polyester fabric that is dyed and has dye and water repellent attached thereon, providing a composite solvent containing water and acetic acid mixed with each other, performing an extraction operation including infiltrating the polyester fabric with the composite solvent and extracting the dye and the water repellent to remove the dye and the water repellent from a material of the polyester fabric so that the polyester fabric is restored and has an L value that is not less than 60 and a water repellent content that is not more than 500 ppm, and carrying out a liquid state polycondensation reaction on the polyester fabric so that an intrinsic viscosity of the polyester fabric is increased and residual impurities of the polyester fabric are further removed.

In certain embodiments, the composite solvent is prepared by mixing 5 to 90 parts by weight of the water with 10 to 95 parts by weight of the acetic acid.

In certain embodiments, in the extraction operation, the intrinsic viscosity of the polyester fabric is decreased, and a magnitude of decrease thereof is not more than 10%. In the liquid state polycondensation reaction, the intrinsic viscosity of the polyester fabric is increased, and a magnitude of increase thereof is within a range from 15% to 40%.

In certain embodiments, in the liquid state polycondensation reaction, the residual impurities of the polyester fabric are at least one of solid impurities and low-boiling organics.

In certain embodiments, the polyester fabric has a glass transition temperature. In the extraction operation, the composite solvent is heated to an extraction temperature to infiltrate the polyester fabric and extract the dye and the water repellent, and the extraction temperature of the composite solvent is greater than the glass transition temperature of the polyester fabric.

In certain embodiments, the glass transition temperature of the polyester fabric is not more than 80° C., and the composite solvent is heated to the extraction temperature that is within a range from 80° C. to 130° C. to infiltrate the polyester fabric and extract the dye and the water repellent.

In certain embodiments, in the extraction operation, an amount of the composite solvent that is used is within a range from 8 times to 30 times that of the polyester fabric, an extraction time of the composite solvent to the polyester fabric is within a range from 0.5 hours to 3.0 hours, and a number of extractions of the composite solvent to the polyester fabric is within a range from 1 time to 6 times.

In certain embodiments, in the polyester fabric, the water repellent has a polymer network cross-linked structure, and the water repellent is at least one material selected from a group consisting of a water repellent containing silicon, a water repellent containing fluorine, a water repellent containing fluorine and silicon, and a water-based polyurethane (PU) water repellent. In the extraction operation, the dye and the water repellent are removed by the acetic acid of the composite solvent.

In certain embodiments, after the extraction operation and before the liquid state polycondensation reaction, the method further includes performing a filtering operation including filtering the composite solvent and the polyester fabric by using a filter so as to separate the composite solvent and the polyester fabric from each other, and performing a drying operation including drying the polyester fabric to remove a residual composite solvent of the polyester fabric.

In certain embodiments, in the liquid state polycondensation reaction, the liquid state polycondensation reaction is carried out on the polyester fabric under a liquid polycondensation pressure that is within a range from 0.01 torrs to 1.00 torr and at a liquid polycondensation temperature that is within a range from 220° C. to 280° C., and then the polyester fabric is filtered through a filter with a filter mesh size that is not more than 5 μm, so that the residual impurities of the polyester fabric are further removed. After the liquid state polycondensation reaction, a content of the water repellent of the polyester fabric is not more than 100 ppm.

In certain embodiments, after the liquid state polycondensation reaction, the method further includes performing a melt granulation operation on the polyester fabric by using a melt granulator so that the polyester fabric is formed into recycled polyester pellets.

Therefore, in the method provided by the present disclosure, by virtue of "providing a composite solvent containing water and acetic acid mixed with each other," "performing an extraction operation including infiltrating the polyester fabric with the composite solvent and extracting the dye and the water repellent to remove the dye and the water repellent from the material of the polyester fabric, so that the polyester fabric is restored to have an L value of not less than 60 and a water repellent content of not more than 500 ppm," and "carrying out a liquid state polycondensation reaction on the polyester fabric so that an intrinsic viscosity of the polyester fabric is increased and residual impurities of the polyester fabric are further removed," the dye and the water repellent attached to the polyester fabric can be effectively removed. Accordingly, the polyester fabric can be recycled more easily, and has good recycling quality. Furthermore, the method provided by the present disclosure has the advantages of low manufacturing cost and high process safety, etc.

The polyester of the present disclosure is a type of linear polymers provided by carrying out a polycondensation reaction on saturated dibasic acids and diols, and the linear polymers are varied by raw material or intermediate. In addition, a common feature of all types of the linear polymers is that each chain links of macromolecules are linked by ester group "—COO—". Accordingly, all types of the linear polymers are generally referred to as polyesters, such as polyethylene terephthalate (PET). The polyesters can be reprocessed to provide fibers that can further be made into various fabrics, various plain-woven fabrics, knitted fabrics, etc.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which:

FIG. 1 is a flowchart of a method for recycling a polyester fabric according to an embodiment of the present disclosure.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

[Method for Recycling Polyester Fabric]

An embodiment of the present disclosure provides a method for recycling a polyester fabric, and in the method, the polyester fabric is at a temperature above a glass transition temperature thereof so that the molecules of the polyester fabric can slide freely between each other, thereby producing the polyester fabric that is soft and loose. Accordingly, a dye of the polyester fabric is facilitated to be dissolved and released by solvent to achieve the decolorization effect.

It should be noted that acetic acid solvent can not only depolymerize (break) the structure of water repellent, but can also accelerate the extraction efficiency of the dye and enhance the decolorization effect. After decolorizing and removing the water repellent from the polyester fabric, the restored polyester fabric is melted into a liquid state by an extruder and then main solid impurities thereof are filtered out by a filter. The polyester in a liquid state is then extruded by being pressed by a perforated plate, flows into a vacuum chamber for liquid state polycondensation reaction (LSP) through gravity sagging to increase an intrinsic viscosity (IV) value, and filtered through a filter with a filter mesh size that is not more than 5 μm to be cooled and finally pelletized.

It should be noted that, conventionally, materials of dyed polyester fabrics contain dye and water repellent, and for recycled polyester fabrics, the dye and the water repellent are impurities. Therefore, before recycling the polyester fabrics, the dye and the water repellent attached to the polyester fabrics must be removed.

In the related art, using solvents for extraction only removes the dye attached to the polyester fabrics, but the water repellent attached to the polyester fabrics cannot be effectively removed. Therefore, the polyester fabrics have excessive residual water repellent that is attached to the materials thereof, so that the polyester fabrics cannot be recycled or lead to problems such as having poor recycling quality and limited use, etc.

In response to the above-referenced technical inadequacies, referring to FIG. 1, the method can effectively remove the dye and the water repellent attached to the polyester fabric at the same time, and the method can be performed to reproduce the polyester fabric into recycled polyester pellets. The method includes step S110, step S120, step S130, step S140, step S150, step S160, and step S170. It should be noted that, the order of the each steps and the practical operation of the present embodiment can be adjusted according to requirements, and the present embodiment is not limited thereto.

The step S110 includes providing a polyester fabric that is dyed and has dye and water repellent attached thereon.

More specifically, a material of the polyester fabric is dyed with dye to have color (e.g., black, red, blue . . . etc.), and the polyester fabric can have water repellent function through water repellent treatment. Generally, the dye is mainly attached to fiber structures of the polyester fabric, and more specifically, attached to an amorphous region of the fiber structures of the polyester fabric. In addition, the water repellent is covered on the fiber structures of the polyester fabric and the dye.

The dye attached to the polyester fabric can be, for example, natural dyes or synthetic dyes. Furthermore, the water repellent has a polymer network cross-linked structure, and the water repellent can be, for example, a water repellent containing silicon, a water repellent containing fluorine, a water repellent containing fluorine and silicon, and a water-based polyurethane (PU) water repellent, but the present disclosure is not limited thereto.

In order to effectively remove the dye and the water repellent attached to the materials of the polyester fabric, the method of the present embodiment is achieved through the following steps S120 to S170. The step S120 includes providing a composite solvent containing water and acetic acid mixed with each other.

In order to allow the composite solvent to have great extraction efficiency for the above-mentioned dye and water repellent, the water and the acetic acid have a preferable ratio configuration. More specifically, the composite solvent is prepared by mixing 5 to 90 parts by weight of the water with 10 to 95 parts by weight of the acetic acid, preferably prepared by mixing 10 to 30 parts by weight of the water with 70 to 90 parts by weight of the acetic acid, and more preferably prepared by mixing 10 to 20 parts by weight of the water with 80 to 90 parts by weight of the acetic acid.

That is, in a preferable embodiment of the present disclosure, the amount of the acetic acid is preferably greater than the amount of the water, and the amount of the acetic acid is preferably within a range from 2 times to 20 times the amount of the water, but the present disclosure is not limited thereto.

The step S130 includes performing an extraction operation including infiltrating the polyester fabric with the composite solvent and extracting the dye and the water repellent to remove the dye and the water repellent from a material of the polyester fabric so that the polyester fabric is restored and has an L value that is not less than 60 and a water repellent content that is not more than 500 ppm. In addition, the abovementioned L value is a parameter value representing brightness in a Lab color space.

More specifically, the polyester fabric has a glass transition temperature (Tg). In the extraction operation, the composite solvent is heated to an extraction temperature to infiltrate the polyester fabric and extract the dye and the water repellent. In addition, the extraction temperature of the composite solvent is greater than the glass transition temperature of the polyester fabric. Accordingly, an extraction efficiency of the composite solvent for the dye and the water repellent can be improved.

In an embodiment of the present disclosure, the glass transition temperature of the polyester fabric is not greater than 80° C., and is approximately within a range from 70° C. to 80° C. (e.g., 75° C.).

In an embodiment of the present disclosure, the composite solvent is heated to the extraction temperature that is within a range from 80° C. to 130° C. to infiltrate the polyester fabric and extract the dye and the water repellent. Preferably, the extraction temperature of the composite solvent is within a range from 100° C. to 120° C. More preferably, the extraction temperature of the composite solvent is within a range from 100° C. to 115° C., but the present disclosure is not limited thereto.

That is, in order to improve the extraction efficiency of the composite solvent for the dye and the water repellent, in the extraction operation, the extraction temperature of the composite solvent (e.g., 100° C. to 115° C.) is preferably higher than the glass transition temperature of the polyester fabric (e.g., 70° C. to 80° C.). Furthermore, the extraction temperature of the composite solvent (e.g., 100° C. to 115° C.) is preferably lower than the boiling point of the acetic acid (e.g., 118° C.), so that the composite solvent can extract the dye and the water repellent in a liquid state, but the present disclosure is not limited thereto.

In an embodiment of the present disclosure, in order to keep the water in the composite solvent from over-evaporating due to heating, the extraction temperature of the composite solvent is preferably within a range from 80° C. to 100° C., so as to be higher than the glass transition temperature of the polyester fabric and lower than the boiling point of water.

In an embodiment of the present disclosure, an amount of the composite solvent that is used is within a range from 8 times to 30 times that of the polyester fabric, and preferably within a range from 10 times to 15 times. In an embodiment of the present disclosure, an extraction time of the composite solvent to the polyester fabric is within a range from 0.5 hours to 3.0 hours, and preferably within a range from 1 hour to 2 hours.

In an embodiment of the present disclosure, a number of extractions of the composite solvent to the polyester fabric is within a range from 1 time to 6 times, and preferably within a range from 3 times to 6 times. It should be noted that, in each of the extraction operations, the dye and the water repellent are extracted by using a new and unused composite solvent.

In an embodiment of the present disclosure, the extraction operation can be performed on the composite solvent under a high-pressure operating condition. In addition, the high-pressure operating condition can, for example, pressurize the composite solvent so that the composite solvent has a liquid pressure that is within a range from 1 bar to 10 bar and then extracts the dye and the water repellent attached to the polyester fabric. If the extraction operation is performed under the high-pressure operating condition, a range of the extraction temperature of the composite solvent can be improved.

It should be noted that, in the abovementioned composite solvent, the acetic acid can be used to remove the water repellent attached to the polyester fabric. More specifically, the acetic acid can serve as a catalyst for hydrolysis and hydrolyze the water repellent with polymer network cross-linked structure, or hydrolyze silane on the molecular structure of the water repellent. Furthermore, the acetic acid can also be used to remove the dye attached to the polyester fabric.

That is, in the extraction operation, the dye and the water repellent attached to the polyester fabric are all removed by the acetic acid of the composite solvent.

More specifically, adding water into the composite solvent can help improve the use safety of the composite solvent. For example, adding a trace amount of water can help decrease an upper explosion value of the composite solvent and increase a lower explosion value of the composite solvent, so that the use safety of the composite solvent can be improved.

In an embodiment of the present disclosure, the composite solvent is prepared by mixing 10 to 30 parts by weight of water with 70 to 90 parts by weight of the acetic acid. In addition, the composite solvent has a lower explosive limit (LEL) that is within a range from 4% to 10%, and the composite solvent has an upper explosive limit (UEL) that is within a range from 14% to 20%, but the present disclosure is not limited thereto.

According to the abovementioned configuration, the composite solvent of the present embodiment can have the lower extraction temperature than the extraction solvent in the related art, so that the composite solvent can not only reduce energy consumption, but also have fiber structures that are not easily damaged.

Furthermore, the extraction temperature of the composite solvent of the present embodiment is greater than the glass transition temperature of the polyester fabric. Accordingly, the composite solvent can help soften the fiber structures of the polyester fabric, so that the composite solvent can enter into the fiber structures of the polyester fabric more easily, thereby improving the extraction efficiency of the dye and the water repellent.

In addition, the composite solvent of the present embodiment uses the acetic acid and the water as the main components, which has the advantages of low cost, less harm to the human body, and high use safety (e.g., a relatively safe explosion limit).

The step S140 includes performing a filtering operation including filtering the composite solvent and the polyester fabric by using a filter so as to separate the composite solvent and the polyester fabric from each other.

In the filtering operation, the aperture of the filter is usually not greater than 5 cm, preferably not greater than 3 cm, and more preferably not greater than 1 cm. Accordingly, the composite solvent and the polyester fabric can be effectively separated from each other.

It should be noted that, in the filtering operation, the composite solvent will carry the dye and the water repellent through the filter, and the composite solvent can be further heated and evaporated or be filtered by activated carbon to separate the dye and the water repellent from each other, so that the composite solvent can be recycled and reused. Furthermore, the restored polyester fabric will remain on the filter to facilitate subsequent operations.

The step S150 includes performing a drying operation including drying the polyester fabric to remove the residual composite solvent of the polyester fabric.

More specifically, the drying operation can, for example, put the polyester fabric in an oven to dry, or put the polyester fabric in a dry environment to dry naturally, but the present disclosure is not limited thereto.

According to the abovementioned configuration, the polyester fabric is restored and has an L value that is not less than 60, preferably not less than 70, and more preferably not less than 80. Furthermore, the restored polyester fabric has an "a" value that is within a range from −2 to 2 and a "b" value that is within a range from −6 to 6. In the aspect of a residual concentration of the water repellent, the restored polyester fabric has a content of the water repellent that is not more than 200 ppm, preferably not more than 150 ppm, and more preferably not more than 100 ppm.

It should be noted that the Lab color space is a color component space, with a dimension L for luminance, "a" and "b" for color component dimensions, and CIE XYZ color space coordinates based on nonlinear compression.

In an embodiment of the present disclosure, the method for recycling the polyester fabric is that the dyed polyester fabric is washed 3 times and for 1 hour each time by using the composite solvent (that contains 20% water and 80% acetic acid) at the extraction temperature that is within a range from 90° C. to 100° C.

Accordingly, the restored polyester fabric has an L value that is within a range approximately from 75 to 80, an "a" value that is within a range from 0.5 to 1.5, and a "b" value that is within a range from 3.0 to 4.0, but the present disclosure is not limited thereto.

The step S160 includes carrying out a liquid state polycondensation reaction (LSP) on the polyester fabric so that an intrinsic viscosity of the polyester fabric is increased and residual impurities of the polyester fabric are further removed.

In the liquid state polycondensation reaction, the residual impurities of the polyester fabric are at least one of solid impurities and low-boiling organics.

It should be noted that, in the extraction operation, the intrinsic viscosity of the polyester fabric is decreased, and a magnitude of decrease thereof is not more than 10% (the IV value decreases to approximately 0.55 to 0.65). Furthermore, in the liquid state polycondensation reaction, the intrinsic viscosity of the polyester fabric is increased, and a magnitude of increase thereof is within a range from 15% to 40% (the IV value increases to approximately 0.65 to 0.75).

Since the intrinsic viscosity of the polyester fabric has a less decrease after performing the extraction operation thereon, the intrinsic viscosity of the polyester fabric may not need to be increased by too much through the liquid state polycondensation reaction. Therefore, the difficulty of the manufacturing process in increasing the intrinsic viscosity of the polyester fabric can be reduced.

More specifically, in the liquid state polycondensation reaction, the liquid state polycondensation reaction is carried out on the polyester fabric under a liquid polycondensation pressure that is within a range from 0.01 torrs to 1.00 torr and at a liquid polycondensation temperature that is within a range from 220° C. to 280° C., and then the polyester fabric is filtered through a filter that has a filter mesh size not more than 5 μm, so that the residual impurities (e.g., at least one of the solid impurities and the low-boiling organics) of the polyester fabric are further removed. In addition, after the liquid state polycondensation reaction, a content of the water repellent of the polyester fabric is not more than 100 ppm.

More specifically, the process of the liquid state polycondensation reaction sequentially includes: melting the restored polyester fabric into the liquid state by an extruder (at a temperature of 220° C. to 280° C.), filtering out the main solid impurities thereof by the filter that has a filter mesh size of 100 μm, extruding the polyester in a liquid state by the perforated plate, having the polyester in the liquid state flow into a vacuum chamber through gravity sagging (under a pressure of 1 torr to 0.01 torrs) for the liquid state polycondensation reaction to increase the IV value by 10% to 40%, and filtering the polyester fabric through a filter with a filter mesh size that is not more than 5 μm for cooling, and finally pelletizing.

The step S170 includes performing a melt granulation operation on the polyester fabric by using a melt granulator so that the polyester fabric is formed into recycled polyester pellets. That is, in the present embodiment, after decolorization, the restored polyester fabric sequentially undergoes the liquid state polycondensation reaction and pelletization to obtain recycled polyester pellets having high intrinsic viscosity, high purity, and high L value.

Experimental Data Test

Embodiments 1 to 6: put the polyester fabric (L=22%, IV=0.610, and 10,000 ppm of the water repellant) and the composite solvent of water/acetic acid into a 1 L beaker, and heat and stir the mixture to extract the dye and the water repellent attached to the polyester fabric.

The process conditions (Table A1) and the quality of the restored polyester fabrics after liquid state polycondensation reaction (260° C., 0.1 torrs) and granulation (Table A2) are as follows:

TABLE A1

| | Feed (g) | | Extraction conditions | | |
|---|---|---|---|---|---|
| | Polyester fabric | Water | Acetic acid | Temperature (° C.) | Time (hr) | Number of extractions |
| Embodiment 1 | 10 | 20 | 180 | 105 | 1 | 3 |
| Embodiment 2 | 10 | 40 | 160 | 100 | 0.5 | 4 |
| Embodiment 3 | 10 | 80 | 120 | 100 | 2 | 3 |
| Embodiment 4 | 10 | 40 | 360 | 105 | 1 | 2 |
| Embodiment 5 | 10 | 80 | 320 | 100 | 0.5 | 2 |
| Embodiment 6 | 10 | 160 | 240 | 100 | 2 | 3 |

The quality of the restored polyester fabrics after liquid state polycondensation reaction (260° C., 0.1 torrs) and granulation are as follows:

TABLE A2

| | The quality of the restored polyester fabric | | | | | After liquid polymerization | |
|---|---|---|---|---|---|---|---|
| | L(%) | a | b | Water repellent (ppm) | IV | Water repellent (ppm) | IV |
| Embodiment 1 | 80 | 0.6 | 3.1 | 180 | 0.564 | 93 | 0.679 |
| Embodiment 2 | 78 | 1.1 | 3.2 | 297 | 0.573 | 134 | 0.726 |
| Embodiment 3 | 75 | 1.4 | 3.8 | 453 | 0.592 | 195 | 0.745 |
| Embodiment 4 | 79 | 1.2 | 3.1 | 239 | 0.567 | 102 | 0.692 |
| Embodiment 5 | 77 | 0.9 | 3.5 | 389 | 0.572 | 152 | 0.723 |
| Embodiment 6 | 76 | 0.8 | 3.4 | 422 | 0.581 | 184 | 0.731 |

Comparative embodiments 1 to 6: put the polyester fabric (L=22%, IV=0.610, and 10,000 ppm of the water repellant) and conventional solvents into a 1 L beaker, and heat and stir the mixture to extract the dye and the water repellent attached to the polyester fabric.

The process conditions (Table B1) and the quality of the restored polyester fabrics are as follows:

TABLE B1

| | Feed (g) | | | Extraction conditions | | |
|---|---|---|---|---|---|---|
| | Polyester fabric | Xylene | EG | Temperature (° C.) | Time (hr) | Number of extractions |
| Comparative embodiment 1 | 10 | 200 | 0 | 120 | 1 | 3 |
| Comparative embodiment 2 | 10 | 100 | 100 | 120 | 0.5 | 4 |
| Comparative embodiment 3 | 10 | 0 | 200 | 110 | 2 | 3 |
| Comparative embodiment 4 | 10 | 400 | 0 | 120 | 1 | 2 |
| Comparative embodiment 5 | 10 | 200 | 200 | 110 | 0.5 | 2 |
| Comparative embodiment 6 | 10 | 0 | 400 | 120 | 2 | 3 |

The quality of the restored polyester fabrics after extraction (Table B2) are as follows.

TABLE B2

| | The quality of the restored polyester fabric | | | | |
|---|---|---|---|---|---|
| | L(%) | A | b | Water repellent (ppm) | IV |
| Comparative embodiment 1 | 82 | 0.8 | 3.7 | 3,879 | 0.527 |
| Comparative embodiment 2 | 82 | 0.7 | 4.1 | 3,564 | 0.514 |
| Comparative embodiment 3 | 78 | 1.3 | 5.6 | 5,243 | 0.507 |
| Comparative embodiment 4 | 81 | 1.5 | 4.4 | 5,412 | 0.528 |
| Comparative embodiment 5 | 79 | 1.8 | 3.5 | 5,784 | 0.511 |
| Comparative embodiment 6 | 83 | 0.6 | 3.6 | 3,372 | 0.489 |

As shown in the abovementioned experimental results, the embodiments 1 to 6 use the composite solvent of water/acetic acid to extract the dye and the water repellent attached to the polyester fabric, so that the polyester fabric is restored and has a less content of the water repellent (not more than 500 ppm). In comparison, the comparative embodiments 1 to 6 use the conventional solvents, such as xylene and ethylene glycol (EG) to extract the dye and the water repellent attached to the polyester fabric, so that the restored polyester still has a greater content of the water repellent (greater than 3,000 ppm).

Beneficial Effects of the Embodiments

In conclusion, in the method provided by the present disclosure, by virtue of "providing a composite solvent containing water and acetic acid mixed with each other," "performing an extraction operation including infiltrating the polyester fabric with the composite solvent and extracting the dye and the water repellent to remove the dye and the water repellent from the material of the polyester fabric, so that the polyester fabric is restored to have an L value of not less than 60 and a water repellent content of not more than 500 ppm," and "carrying out a liquid state polycondensation reaction on the polyester fabric so that an intrinsic viscosity of the polyester fabric is increased and residual impurities of the polyester fabric are further removed," the dye and the water repellent attached to the polyester fabric can be effectively removed. Accordingly, the polyester fabric can be recycled more easily, and has good recycling quality. Furthermore, the method provided by the present disclosure has the advantages of low manufacturing cost and high process safety, etc.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for recycling a polyester fabric, comprising:
   providing a polyester fabric that is dyed and has dye and water repellent attached thereon;
   providing a composite solvent consisting of water and acetic acid mixed with each other, wherein the composite solvent is prepared by mixing 10 to 30 parts by weight of the water with 70 to 90 parts by weight of the acetic acid;
   performing an extraction operation including infiltrating the polyester fabric with the composite solvent and extracting the dye and the water repellent to remove the dye and the water repellent from a material of the polyester fabric so that the polyester fabric is restored and has an L value that is not less than 60 and a water repellent content that is not more than 500 ppm; and
   carrying out a liquid state polycondensation reaction on the polyester fabric so that an intrinsic viscosity of the polyester fabric is increased and residual impurities of the polyester fabric are further removed.

2. The method according to claim 1, wherein in the extraction operation, the intrinsic viscosity of the polyester fabric is decreased, and a magnitude of decrease thereof is not more than 10%, and wherein in the liquid state polycondensation reaction, the intrinsic viscosity of the polyester fabric is increased, and an magnitude of increase thereof is within a range from 15% to 40%.

3. The method according to claim 1, wherein in the liquid state polycondensation reaction, the residual impurities of the polyester fabric are at least one of solid impurities and low-boiling organics.

4. The method according to claim 1, wherein the polyester fabric has a glass transition temperature, wherein in the extraction operation, the composite solvent is heated to an extraction temperature to infiltrate the polyester fabric and extract the dye and the water repellent, and wherein the extraction temperature of the composite solvent is greater than the glass transition temperature of the polyester fabric.

5. The method according to claim 4, wherein the glass transition temperature of the polyester fabric is not more than 80° C., and the composite solvent is heated to the extraction temperature that is within a range from 80° C. to 130° C. to infiltrate the polyester fabric and extract the dye and the water repellent.

6. The method according to claim 1, wherein in the extraction operation, an amount of the composite solvent that is used is within a range from 8 times to 30 times that of the polyester fabric, an extraction time of the composite solvent to the polyester fabric is within a range from 0.5 hours to 3.0 hours, and a number of extractions of the composite solvent to the polyester fabric is within a range from 1 time to 6 times.

7. The method according to claim 1, wherein in the polyester fabric, the water repellent has a polymer network cross-linked structure, and the water repellent is at least one material selected from a group consisting of a water repellent containing silicon, a water repellent containing fluorine, a water repellent containing fluorine and silicon, and a water-based polyurethane (PU) water repellent, and wherein in the extraction operation, the dye and the water repellent are removed by the acetic acid of the composite solvent.

8. The method according to claim 1, wherein, after the extraction operation and before the liquid state polycondensation reaction, the method further comprises:
   performing a filtering operation including filtering the composite solvent and the polyester fabric by using a filter so as to separate the composite solvent and the polyester fabric from each other; and
   performing a drying operation including drying the polyester fabric to remove a residual composite solvent of the polyester fabric.

9. The method according to claim 1, wherein the liquid state polycondensation reaction is carried out on the polyester fabric under a liquid polycondensation pressure that is within a range from 0.01 torrs to 1.00 torr and at a liquid polycondensation temperature that is within a range from 220° C. to 280° C., and then the polyester fabric is filtered through a filter with a filter mesh size that is not more than 5 µm, so that the residual impurities of the polyester fabric are further removed, and wherein, after the liquid state polycondensation reaction, a content of the water repellent of the polyester fabric is not more than 100 ppm.

10. The method according to claim 1, wherein, after the liquid state polycondensation reaction, the method further comprises performing a melt granulation operation on the polyester fabric by using a melt granulator so that the polyester fabric is formed into recycled polyester pellets.

* * * * *